US012338367B2

(12) United States Patent
Reimann et al.

(10) Patent No.: US 12,338,367 B2
(45) Date of Patent: Jun. 24, 2025

(54) WATER-BASED COATING COMPOSITIONS FOR SCUFF AND SCRATCH RESISTANCE

(71) Applicant: SWIMC LLC, Cleveland, OH (US)

(72) Inventors: Jay Reimann, Mentor, OH (US); Adriana Hemann, Strongsville, OH (US); Esther Mccartney, Cleveland, OH (US); Leo Lazaruk, Parma, OH (US); Angelo P. Mandato, Gates Mills, OH (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 18/679,816

(22) Filed: May 31, 2024

(65) Prior Publication Data

US 2024/0400842 A1 Dec. 5, 2024

Related U.S. Application Data

(60) Provisional application No. 63/505,768, filed on Jun. 2, 2023.

(51) Int. Cl.
| | | |
|---|---|---|
| *C09D 7/00* | (2018.01) | |
| *C09D 7/40* | (2018.01) | |
| *C09D 7/42* | (2018.01) | |
| *C09D 7/61* | (2018.01) | |
| *C09D 7/65* | (2018.01) | |

(52) U.S. Cl.
CPC ............ *C09D 7/65* (2018.01); *C09D 7/42* (2018.01); *C09D 7/61* (2018.01); *C09D 7/69* (2018.01); *C09D 7/70* (2018.01)

(58) Field of Classification Search
CPC ... C09D 7/65; C09D 7/69; C09D 7/61; C09D 7/70; C09D 7/42
USPC ......................................................... 106/230
See application file for complete search history.

(56) References Cited

U.S. PATENT DOCUMENTS

| | | | |
|---|---|---|---|
| 4,025,483 A | 5/1977 | Ramig, Jr. | |
| 8,980,995 B2 | 3/2015 | Yang et al. | |
| 10,676,580 B2 | 6/2020 | Beshah et al. | |
| 10,865,276 B2 | 12/2020 | Bohling et al. | |
| 10,913,867 B2 | 2/2021 | Bohling et al. | |
| 11,505,715 B2 | 11/2022 | Guo et al. | |
| 2002/0069790 A1 | 6/2002 | Hayashi et al. | |
| 2010/0210745 A1* | 8/2010 | McDaniel ............... C09D 7/48 521/55 |
| 2011/0250626 A1* | 10/2011 | Williams ............... C12Q 1/34 106/4 |
| 2012/0097194 A1* | 4/2012 | McDaniel ............ A01N 63/50 435/197 |
| 2014/0373757 A1 | 12/2014 | Schoelkopf et al. | |
| 2016/0168409 A1 | 6/2016 | Booth et al. | |
| 2017/0321078 A1 | 11/2017 | Yang et al. | |
| 2018/0030304 A1 | 2/2018 | Grossschartner et al. | |
| 2018/0142103 A1 | 5/2018 | Beaudry et al. | |
| 2019/0144685 A1 | 5/2019 | Dugan et al. | |
| 2019/0249015 A1 | 8/2019 | Fujimura et al. | |
| 2022/0325124 A1 | 10/2022 | Bohling et al. | |
| 2023/0159741 A1 | 5/2023 | Bohling et al. | |
| 2023/0174817 A1 | 6/2023 | Eryazici et al. | |

FOREIGN PATENT DOCUMENTS

| | | |
|---|---|---|
| WO | WO 2017/015006 A1 | 1/2017 |
| WO | WO 2017/192982 A1 | 11/2017 |
| WO | WO 2020/239634 A1 | 12/2020 |
| WO | WO 2022/192377 A1 | 9/2022 |
| WO | WO 2022/204764 A1 | 10/2022 |
| WO | WO 2019/160681 A1 | 8/2024 |

OTHER PUBLICATIONS

International Search Report and Written Opinion issued in related PCT Application No. PCT/US2024/031930, dated Aug. 27, 2024 (9 pps.).
International Search Report and Written Opinion issued in related PCT Application No. PCT/US2024/031931, dated Aug. 28, 2024 (9 pps.).
DOWSIL 52 Additive, DOW Technical Data Sheet, Form No. 26-1099-01-0220 S2D, (8 pps.).
Spheromers CA—monosized PMMA beads, Technical Data Sheet, www.micro-beads.com (1 pg.).

* cited by examiner

*Primary Examiner* — James E McDonough
(74) *Attorney, Agent, or Firm* — Honigman LLP

(57) ABSTRACT

A waterborne coating composition including a film-forming binder, a water-based carrier liquid, monosize polymeric particles having a coefficient of variation (CV) of about 50 percent or less and a Shore D hardness of at least about 75 as measured by ASTM D2240-15; and a polysiloxane dispersible in water, which provides improved scuff and mar resistance in architectural coating compositions.

20 Claims, No Drawings

WATER-BASED COATING COMPOSITIONS FOR SCUFF AND SCRATCH RESISTANCE

CROSS REFERENCE TO RELATED APPLICATION

This application claims priority under 35 U.S.C 119(e) to U.S. Provisional Application No. 63/505,768 filed on Jun. 2, 2023. The entire contents of the aforementioned application is incorporated herein.

FIELD

This application generally relates to compositions for water-based coating compositions that provide increased scuff and scratch resistance in a dried coating.

BACKGROUND

Coating compositions suitable for architectural paints and stains tend to be complex mixtures of ingredients including pigments, film forming resins or binders, solvents, and other functional additives often tailored to meet various performance standards. In some applications, for instance, coating compositions include additives to achieve certain sheen levels, scratch resistance, and/or scuff resistance. For instance, some prior coating compositions often included hollow glass microspheres and/or high density polyethylene particles to impart increased scuff or rubber mar resistance to the applied coating. However, such prior compositions tended not to be effective in all coating sheens and/or, even if good scuff resistance was obtained, then other performance characteristics, like wet and dry burnish, were compromised. Balancing scuff performance with other performance characteristics tends to be most problematic in flat sheens because these formulations include higher amounts of extenders relative to polymer. The problem is particularly prevalent in flat sheens with deep and ultra deep bases, because these compositions tend to have higher proportions of mineral extenders relative to white-colored compositions. However, the problem can be present in other sheen levels as well depending on the composition, substrate for the coating, and/or application.

Disclosed herein are coating compositions that provide for increased scuff and scratch resistance in flat sheens, and particularly in deep and ultra deep bases.

SUMMARY

In one embodiment, a coating composition is described including a film-forming binder, an aqueous carrier liquid, and monosize polymeric particles having a particle size coefficient of variation (CV) of about 50 percent or less and a Shore D hardness of at least about 75 as measured by ASTM D2240-15; and a polysiloxane dispersable in water.

In some aspects, the monosize polymeric particles have a round cross-section. In some aspects, the cross-section of the monosize polymeric particles has an aspect ratio of 1:1 to 3:1.

In some aspects, the $D_{50}$ of the monosize polymeric particles is from 5 to 30 microns In some aspects, the monosize polymeric particles include a polyalkyl(meth)acrylate, preferably poly methylmethacrylate.

In some aspects, the monosize polymeric particles are present in the coating composition in an amount of at least 4 weight percent based on the total components of the coating composition.

In some aspects, the monosize polymeric particles have a glass transition temperature (Tg) of at least 100° C. and no more than 180° C. as measured by Differential Scanning Calorimetry.

In some aspects, the polysiloxane is present in the coating composition in an amount of at least 0.25 wt. % to at most 5 wt. % based on the total weight of components of the coating composition.

In some aspects the coating composition further includes an opacifying inorganic pigment, preferably titanium dioxide.

In some aspects, the opacifying pigment is present in the coating composition in an amount of no greater than 10 wt. % based on the total components of the coating composition.

In some aspects, the coating composition further includes wax particles having a mean particle size of 1 to 6 microns.

In some aspects, the wax particles are micronized or spray melt particles.

In some aspects, the $D_{50}$ particle size of the monosize polymeric particles is larger than the $D_{50}$ particle size of the wax particles.

In some aspects, the coating composition further includes an inorganic extender, a wet-state preservative, a rheology modifier, a colorant, a mildewcide, a surfactant, a defoamer, a coalescent, a plasticizer, an anti-settling agent, a pH modifier, a UV absorber, a crosslinker, or a thickener.

In some aspects, when the coating composition is coated on a substrate by drawdown using a 4 mil Bird bar and allowed to cure for about 10 minutes at room temperature followed by 30 minutes at 50° C., the cured coating has a gloss of less than about 10 and/or a sheen of less than about 10 as measured by ASTM D523.

In some aspects, when the coating composition when coated on a substrate by drawdown using a 4 mil Bird bar and allowed to cure for about 10 minutes at room temperature followed by 30 minutes at 50° C., the cured coating has a gloss of less than 5 and a sheen of less than 5 as measured by ASTM D523.

In some aspects, the film-forming binder is a (meth) acrylic latex, a styrene-acrylic latex, a urethane modified acrylic latex, or combinations thereof.

Also disclosed is a cured coating obtained from the disclosed coating compositions, wherein when deposited on a substrate and cured, the cured coating has a gloss of less than about 10 and/or a sheen of less than 10 pursuant to ASTM D523, and wherein the cured coating has a static coefficient of friction (COF) of 0.75 to 1.5 as measured by ASTM D1894-14, or a kinetic coefficient of friction (COF) of 0.25 to 0.75 as measured by ASTM D1894-14.

In some aspects, the cured coating has an the cured coating derived from wherein the cured coating has an average rubber mar test score of at least 7 when tested according to the rubber mar test described herein using black rubber doorstop, black cabinet castor wheel, and a black block resistance rubber stopper as marring objects.

The coating compositions and cured coatings the previous paragraphs of this Summary may further include one or more optional features or embodiments in any combination. These optional features or embodiments include one or more of the following: wherein the wax particles are micronized particles; and/or wherein the wax particles are spray melt particles; and/or wherein the coating composition is aqueous; and/or wherein a mean particle size of the monosize polymeric particles is larger than a mean particle size of the wax particles; and/or wherein the coating composition or package further includes an inorganic pigment, preferably $TiO_2$; and/or wherein the inorganic pigment is TiO2; and/or wherein the coating composition or package further includes an inorganic extender; and/or wherein the monosize polymeric particles have a uniform cross-section and, preferably, are spherical polymeric particles; and/or wherein the monosize polymeric particles have a mean particle size of about 5 to about 30 microns, preferably about 10 to about 30 microns, more preferably about 15 to about 22 microns, and most preferably about 18 to about 22 microns; and/or wherein a mean particle size of the monosize polymeric particles is at least about 2 times larger than a mean particle size of the micronized or spray-melt wax particles, preferably about 3 times larger, and more preferably about 4 times larger.

Continuing, the optional features or embodiments, which may be combined with any preceding embodiment or optional features, alone or in combination include one or more of the following: wherein the monosize polymeric particles are present in the coating composition in an amount of about 4 to about 8 weight percent or about 5 to about 7 weight percent based on the total weight of components in the coating composition; and/or wherein the monosize polymeric particles include polymers derived from alkyl (meth) acrylates, preferably methyl(meth)acrylates; and/or wherein the monosize polymeric particles have a glass transition temperature (Tg) of at least about 100° C., preferably about 110° C. to about 180° C., more preferably about 100° C. to about 150° C., and most preferably about 120° C. to about 140° C.; and/or wherein the polysiloxane is present in the coating composition in an amount of about 0.25 to about 5 weight percent, preferably about 1.25 to about 3.5 weight percent, and more preferably about 2 to about 2.5 weight percent based on total weight of components in the coating composition.

Continuing, the optional features or embodiments, which may be combined with any preceding embodiment or optional features, alone or in combination include one or more of the following: wherein the wax particles are polyethylene; and/or wherein the wax particles are high density polyethylene; and/or wherein the wax particles are low density polyethylene; and/or wherein the wax particles have a Shore D hardness less than about 100, less than about 90, or preferably, less than about 80; and/or wherein the wax particles include a polyamide, a polyamideimide, a polytetrafluoroethylene, a poly vinyl acetate, or a butyl styrene polymer, or a natural wax, or a MONTAN wax; and/or wherein the wax particles are present in an amount of about 1 to about 7 weight percent, preferably about 2 to about 5 weight percent, and more preferably about 2.5 to about 4 weight percent based on the total weight of components in the coating composition; and/or wherein the wax particles have a melting point of less than about 140° C., preferably about 90° C. to about 135° C., more preferably about 105° C. to about 125° C., and most preferably about 108° C. to about 115° C.; and/or wherein the coating composition includes a weight ratio of the monosize polymeric particles to the wax particles of about 2:1 to about 1.5:1 or about 1.05:1 to about 1:1.

Continuing, the optional features or embodiments, which may be combined with any preceding embodiment or optional features, alone or in combination include one or more of the following: wherein when coated on a substrate by drawdown using a 4 mil Bird bar and allowed to cure for about 10 minutes at room temperature followed by 30 minutes at 50° C., the cured coating has a gloss of less than about 5 and/or a sheen of less than about 5 as measured by ASTM D523; and/or wherein when coated on a substrate by drawdown using a 4 mil Bird bar and allowed to cure for about 10 minutes at room temperature followed by 30 minutes at 50° C., the cured coating has a gloss of less than about 10 and/or a sheen of less than about 10 as measured by ASTM D523; and/or wherein when coated on a substrate by drawdown using a 4 mil Bird bar and allowed to cure for about 10 minutes at room temperature followed by 30 minutes at 50° C., the cured coating has a gloss of greater than about 10 and/or a sheen of greater than about 10 as measured by ASTM D523.

Continuing, the optional features or embodiments, which may be combined with any preceding embodiment or optional features, alone or in combination include one or more of the following: wherein the latex binder is a (meth) acrylic latex, a styrene-acrylic latex, a urethane modified acrylic latex, or combinations thereof; and/or wherein the coating composition further includes acetoacetoxyethyl methacrylate; and/or wherein the coating composition further includes adipic dihydrazide; and/or wherein the inorganic pigment comprises titanium dioxide; and/or wherein the inorganic pigment is present in an amount of about 10 to about 30 weight percent, or in an amount of about 5 to about 10, or in an amount of less than about 5 weight percent.

Continuing, the optional features or embodiments, which may be combined with any preceding embodiment or optional features, alone or in combination include one or more of the following: wherein a pigment volume concentration (PVC) of the coating composition is between about 45 to about 55, or in an amount of about 35 to about 45 weight percent, or in an amount of about 18 to about 40 weight percent, or in an amount of about 10 to about 26 weight percent, or in an amount of about 1 to about 12 weight percent; and/or when applied using an 8 mil Bird applicator drawdown and cured for 1 week at 23° C. and 50% relative humidity, the coating composition has a static coefficient of friction (COF) of about 0.75 to about 1.5, preferably less than 1.25, and even more preferably less than 1.1 as measured by ASTM D1894-14; and/or when applied using an 8 mil Bird applicator drawdown and cured for 1 week at 23° C. and 50% relative humidity, the coating composition has a kinetic coefficient of friction (COF) of about 0.25 to about 0.75, preferably less from about 0.35 to 0.55, as measured by ASTM D1894-14.

Continuing, the optional features or embodiments, which may be combined with any preceding embodiment or optional features, alone or in combination include one or more of the following: wherein the coating composition is substantially free of inorganic extenders; and/or wherein the coating composition has a weight per gallon of about 7 to about 11 lbs/gallon; and/or wherein the coating composition includes a rheology modifier, preferably one of a hydrophobically modified urethane (HEUR), a hydroethylcellulose (HEC), a hydroxy alkali swellable emulsion (HASE), or combination thereof; and/or wherein the coating composition or organic extender additive includes a surfactant; and/or wherein the coating composition contains 1 wt % or less, about 0.5 wt % or less, about 0.25 wt % or less, about 0.01 wt % or less, or no intentionally added alkylphenol ethoxylates (APEOs) based on the total weight of components of the coating composition; and/or wherein the coating composition has less than about 250 g/L VOC, preferably less than about 150 g/L VOC, more preferably less than about 50 g/L VOC, more preferably less than 2 about 5 g/L VOC, and even more preferably less than about 10 g/L VOC, or most preferably, essentially free of VOCs; and/or wherein the coefficient of variation (CV) of the monosize polymeric particles is about 40 percent or less, about 30 percent or less, about 20 percent or less, about 15 percent or less, about 10 percent or less, or about 5 percent or less.

In yet further embodiments, a cured coating is described herein including any embodiment of the coating composition as described in this summary including a latex binder cured for 24 hours; wherein the cured coating has a gloss of less than about 5 and/or a sheen of less than about 5 pursuant to ASTM D523, and a static coefficient of friction (COF) of about 0.75 to about 1.5, preferably less than 1.25, and even more preferably less than 1.1 as measured by ASTM D1894-14, or a kinetic coefficient of friction (COF) of about 0.25 to about 0.75, preferably less from about 0.35 to 0.55, as measured by ASTM D1894-14.

In yet further embodiments, a cured coating is described herein including any embodiment of the coating composition as described in this Summary and applied to a substrate and cured for 24 hours; wherein the cured coating has a 60 Gloss of less than about 5 and an 85 Sheen of less than about 5 per ASTM D523, and an average rubber mar test score of at least 7 when tested according to the rubber mar test described herein using black rubber doorstop, black cabinet castor wheel, and a black block resistance rubber stopper as marring objects.

In yet further embodiments, a coated substrate is described herein formed from any embodiment of the coating composition as described in this Summary and applied directly or indirectly to a substrate consisting of drywall, wood, vinyl, metal, cementitious fibreboard, or combinations thereof.

The above summary of the present disclosure is not intended to describe each disclosed embodiment or every implementation of the present disclosure. The description that follows more particularly exemplifies illustrative embodiments. In several places throughout the disclosure, guidance is provided through lists of examples, which examples may be used in various combinations. In each instance, the recited list serves only as a representative group and should not be interpreted as an exclusive or exhaustive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION

The present disclosure provides a waterborne coating composition including a film-forming binder resin, monosize polymeric particles, and one or more functionalized additives effective to achieve good scuff resistance and good scratch resistance in a cured or dried coating at the same time. The waterborne coating compositions of the present application are particularly effective for flat or matte sheens having a pigment volume concentrate (PVC) of at least about 35, at least about 40, or at least about 45, but may also work in waterborne coating compositions having other gloss or sheen levels as well. As discussed more below, the monosize polymeric particles of the composition herein, in one aspect, have a selected particle size and/or selected narrow particle size coefficient of variation (CV) and, in another aspect, a minimum hardness configured to aid in achieving the dual benefits of scratch and scuff resistance when combined with the other functionalized additives. In some approaches, the monosize polymeric particles of the compositions herein are combined with either a polysiloxane dispersion and/or certain softer micronized or spray-melt wax particles having a tight particle size distribution to aid in achieving the coating performance described herein. The coating compositions described herein are architectural coating compositions, for coating architectural structures and substrates such as wood, drywall, cement, and hardieboard.

Monosize Polymeric Particles

The monosize polymeric particles of the present disclosure are an organic matting or extender agent, such as one or more thermoplastic polymers having a relatively narrow particle size distribution and tend to be harder polymeric particles. If these organic particles are too large, have a broad particle size distribution, and/or have too soft of a morphology, then the coatings derived from the composition herein cannot achieve the dual benefits of scuff and scratch resistance at the same time. The polymeric particles are also monosize, meaning that they have a single particle size peak in particle size distribution. The monosize polymeric particles are not latex polymeric particles such as the polymeric particles of the latex binder.

In some embodiments, the monosize polymeric particles have a tight distribution of particle diameters such that about 90 percent or more, or in other approaches, about 95 percent or more of the particles have a diameter within +/−5 percent or within about +/−10 percent of the mean particle diameter. In other approaches, the monosize polymeric particles may have a distribution of particle diameters having a coefficient of variation or CV (that is, standard deviation divided by mean times 100 percent) of about 50 percent or less, about 40 percent or less, about 30 percent or less, about 20 percent or less, about 10 percent or less, or about 5 percent or less. Preferably, the monosize polymeric particles have a mean particle size or D50 of about 5 to about 30 microns, more preferably about 10 to about 30 microns, most preferably about 15 to about 25 microns, and even more preferably about 19 to about 21 microns with the CV noted above. In yet another approach, the monosize polymeric particles preferably have a narrow particle size distribution with a D50 of about 18 to 20 microns, a D50 of about 19 to 21 microns, and a D99 of about 20 to 22 microns.

In another aspect, the monosize polymer particles preferably have a round cross-section along at least one axis, and, in some approaches, are spherical or substantially spherical particles. In one approach, the monosize polymer particles may have an aspect ratio (that is, particle length to particle width) of about 1:1 to about 3:1, preferably about 1:1 to about 2:1, more preferably about 1:1 to about 1.5:1, and most preferably about 1:1. This aspect ratio generally means that the monosize polymeric particles have a substantially spherical or essentially spherical shape, ovular shape, or prismatic shape, or a part thereof (such as a hemisphere or cup), but in all cases, free of large, sharp points. The monosize particles may be formed by polymerization around a seed or passage of particles through a series of sieves to achieve a narrow particle-size distribution. This is in contrast to non-spherical particles such as micronized particles, acicular particles, or flake-like particles. Inorganic mined extenders such as nepheline syenite, sold as Minex by Covia Corp., for example, may include such irregular shapes and sharp points. For instance, the monosize monosize polymeric particles herein, when viewed under an electron microscope, tend to have a spherical, round, or ball-like shape.

In embodiments, the monosize monosize polymeric particles are derived from thermoplastic polymers such as, but not limited to, acrylic (or ester derivatives thereof), ABS, nylon, polycarbonate, polyamide, polyimide, polyetheretherketone, and copolymers thereof. In some embodiments, the polymers or copolymers having a glass transition temperature (Tg) of at least about 100° C., at least about 110° C., at least about 120° C., or at least about 130° C. and, in other approaches, about 200° C. or less, about 180° C. or less, about 160° C. or less, about 150° C. or less, or about 140° C. or less. In one approach, the monosize monosize polymeric particles are preferably alkyl (meth)acrylates, and more preferably, methyl(meth)acrylate polymers.

The monosize monosize polymeric particles also tend to be relatively hard in the plastic region, but not as hard as prior inorganic matting or extender particles. In one approach, the monosize monosize polymeric particles suitable for the compositions herein have a Shore D hardness (ASTM D2240-15) of at least about 75, at least about 85, at least about 95 to about 100 or less, about 99 or less, about 98 or less, about 95 or less, or about 90 or less. If these particles are not hard enough, then the performance is degraded. Unlike the film forming binders commonly used in coating compositions that form a continuous film when dried, the monosize polymeric particles or dispersions thereof retain discrete particle identity when dried from the coating compositions herein.

In some approaches or embodiments, the monosize polymeric particles are present in the waterborne coating compositions herein in an amount of at least about 4 weight percent, at least about 5 weight percent, or at least about 7 weight percent based on the total weight of components in the coating composition. In some approaches or embodiments, the monosize polymeric particles are present in an amount of at most about 15 weight percent, at most about 12 weight percent, or at most about 11 weight percent based on the total weight of components in the coating composition. In some approaches or embodiments, the monosize polymeric particles are present in the coating composition in an amount of about 4 to about 15 weight percent or about 5 to about 12 weight percent or 7 to about 11 weight percent based on the total weight of components in the coating composition.

Wax Particles

In some approaches, the waterborne coating compositions herein may also include wax particles having a small particle size combined with the monosize polymeric particles. In approaches or embodiments, the wax particles have a mean particle diameter of about 10 microns or less, in other approaches, about 1 to about 6 microns, and preferably, a mean particle diameter of about 4 to about 6 microns. The wax particles also tend to have a softer morphology than the monosize polymeric particles discussed above and an irregular shape. When combined with the monosize polymeric particles in certain relationships, the combination of the two particle types aid in achieving the duel benefits of scuff and scratch resistance of the dried coatings.

In approaches or embodiments, the wax particles may be, but not limited to, polyolefin wax, ethylene butyl styramide wax, polyamide wax, polyester wax, polyvinyl acetate wax, ethylene vinyl acetate wax, polyamideimide wax, ethylene bis stearamide wax, polytetrafluoroethylene wax, montan wax, paraffin wax, microcrystalline paraffin wax, polyethylene wax, polypropylene wax, Fischer-Tropsch wax, butyl styrene wax, natural waxes, derivatives thereof, or mixtures thereof. In one approach, the wax particles may be a high density polyethylene having a density of about 0.93 g/cm$^3$ to about 0.97 g/cm$^3$, or about 0.94 g/cm$^3$ to about 0.96 g/cm$^3$. In yet other approaches, any of the waxes herein may be a bio-based material that is bio-sourced or bio-derived and may include non-petrochemical-based materials. In other approaches, the bio-based materials may be sourced from renewable processes and/or prepared from natural or renewable biological resources.

The wax particles have a mean particle size in the micron range (preferably 10 microns or less) and tend to more irregularly-shaped particles as compared to the spherical monosize polymeric particles discussed above. As noted above, the micronized or spray-melt wax particles have a mean particle diameter of about 1 to about microns 6 (preferably about 4 to about 6 microns). Unlike the film forming binders commonly used in coating compositions that form a continuous film when dried, the wax particles retain discrete particle identity when dried from the coating compositions herein.

In some approaches, the wax particles may be generated by micronization or a spray-melt process. Such particles such that they have a size in the order of magnitude of microns (e.g., <100 microns). Micronization can be achieved by passing particles particles through a series of sieves, milling or grinding the particles. For instance, micronization can occur by milling the wax particles in a cylindrical mill with a milling medium, wherein the cylindrical mill has an annularly oriented series of screens such that larger particles remain in the inner-most portion while smaller particles pass through one or more screens, resulting in a series of small particles. Spray-melt particles are processed by spraying a melt of molten or amorphous-phase wax through a spray nozzle to yield small particles.

The micronized or spray-melt wax particles also tend to be softer than the monosize particles discussed above. In other approaches, the micronized or spray-melt wax particles may have a melting point of less than about 140° C., preferably about 90° C. to about 135° C., more preferably about 105° C. to about 125° C., and most preferably about 108° C. to about 115° C. In yet other approaches, the micronized or spray-melt wax particles may have a Shore D hardness (ASTM D2240-15) of less than about 100, less than about 90, or less than about 80. In other approaches, the micronized or spray-melt wax particles may have a Shore D hardness of about 50 or more, about 60 or more, or about 70 or more.

The wax particles are more irregularly shaped as compared to the monosize polymeric particles discussed above. For instance, the shape could be a circular, highly oblong, irregular, plate-like, needle-like, sickle-like, or fibrous. In contrast to the monosized polymeric particles, the micronized or spray-melt wax particles can have virtually any shape or morphology.

In approaches or embodiments, the coating compositions herein may include about 1 to about 7 weight percent of the wax particles, preferably about 2 to about 5 weight percent, and more preferably about 2.5 to about 4 weight percent of the wax particles based on the total weight of the components in the coating compositions. In approaches, the amounts and sizes of the monosize polymeric particles and the wax particles are blended to aid in achieving the coating performance. Preferably, the coating compositions herein include more of the monosize polymeric particles than the wax particles. In embodiments, for instance, the coating compositions herein may include a weight ratio of the monosize polymeric particles to the micronized or spray-melt wax particles of about 2:1 to about 1.5:1 or about 1.05:1 to about 1:1. Additionally, the monosize polymeric particles tend to be larger in size than the wax particles. For instance, a mean particle size of the monosize polymer particles is at least about 2 times larger than a mean particle size of the wax particles, preferably about 3 times larger, and more preferably about 4 times larger.

Particle Sizes.

The particle sizes referred to in any embodiment herein may be determined by laser diffraction particle size analysis using, for instance, a Beckman Coulter LS 230 Laser Diffraction Particle Size Analyzer or equivalent, calibrated as recommended by the manufacturer. Particle size distribution and/or the particle size "D-values" (e.g., D10, . . . . D50, D90, D95, and D99) are the particle sizes which divide a sample's volume into a specified percentage when the particles are arranged on an ascending particle size basis. For example, for particle size distributions the median is called the D50 (or ×50 when following certain ISO guidelines). The D50 is the particle size in microns that splits the distribution with half the number above and half the number below this diameter. Thus, the D90, for example, describes the particle size where ninety percent of the distribution has a smaller particle size and ten percent has a larger particle size. The $D_v50$ (or $D_v0.5$) is the median for a volume distribution. Likewise, the D95 describes the particle size where ninety five percent of the distribution has a smaller particle size and five percent has a larger particle size and so forth. Unless specified otherwise herein, D50, D90, D95, and D99 refer to the volume distribution: $D_v50$, $D_v90$, $D_v95$, and $D_v99$, respectively. The D-values specified herein may be determined by laser diffraction particle size analysis.

Samples for laser diffraction particle size analysis can be prepared, for example, by diluting the samples in a substantially non-swelling solvent (such as cyclohexanone or 2-butoxyethanol) and shaking them until evenly dispersed. The choice of a suitable solvent will depend upon the particular particles to be tested. Solvent screening tests may need to be conducted to identify a suitable substantially non-swelling solvent. By way of example, a solvent in which a polymer particle swells by about 1% or less (as determined by laser diffraction particle size analysis) would be considered a substantially non-swelling solvent.

Water-Based Carrier Liquid

Coating compositions of the present disclosure include a water-based carrier liquid to carry each of the coating composition components. Coating compositions of the present disclosure are aqueous, in that they include a water-based carrier liquid. The carrier liquid is water-based (>50 wt. % water in the carrier liquid system). The carrier liquid may further include a solvent selected from aliphatic, cycloaliphatic and aromatic hydrocarbons such as white spirit, cyclohexane, toluene, xylene and naptha solvent, esters such as methoxypropyl acetate, n-butyl acetate and 2-ethoxyethyl acetate; octamethyltrisiloxane, or other solvents used in solvent borne systems and mixtures thereof. Carrier liquids may also include recycled liquid from manufacturing of paints, adhesives, sealants, stains, caulks, and mineral and pigment slurries. Compositions of the present disclosure may include one or more carrier liquids. In some approaches, the carrier liquid or liquids are selected so as to provide an aqueous composition that is has than about 250 g/L, in other approaches, less than about 150 g/L, less than about 50 g/L, in less than about 10 g/L, less than about 5 g/L, or no VOCs or essentially no VOCs.

In some embodiments, carrier liquids may constitute 5-60% by volume of a coating composition. In some embodiments, carrier liquids may constitute 40-60% of an aqueous polymeric binder composition.

Polysiloxane Dispersion

In an embodiment, the waterborne coating composition herein may also include polysiloxane emulsions or dispersions combined with the monosize polymer particles. Suitable polysiloxane emulsions or dispersions include, but are not limited to, polydimethylsiloxane (PDMS) emulsions, polydiethylsiloxane (PDES) emulsions and the like that are readily dispersible in water. In some approaches, the polysiloxane dispersions or emulsions may include hydroxy-terminated polydimethylsiloxane, ethoxylated C11 to C15 secondary alcohols, and glycol-modified trimethylated silica The hydroxyl-terminated polydimethylsiloxane may be present in the emulsion or dispersion in the form of spherical droplets having a $D_v50$ equal to or less than 10 microns, as measured by laser diffraction. In some approaches, the polysiloxane dispersions may have a solids content of about 45% to about 85% of the polydimethylsiloxane and a viscosity of about 1,000 cP to 10,000 cP, or about 2,000 to about 8,000 cP, or about 3,000 to about 5,000 cP. Suitable polysiloxane dispersions may include Dowsil™ 14, Dowsil™ 18, Dowsil™ 27, Dowsil™ 29, Dowsil™ 51, Dowsil™ 52, Dowsil™ 54, Dowsil™ 55, Dowsil™ 205SL, Dowsil™ 210S, Dowsil™ 511S, Dowsil™ 62, Dowsil™ 68, Dowsil™ 106F, and Dowsil™ 108F, from The Dow Chemical Company. While not wishing to be bound by theory, it is believed that addition of a polysiloxane slip additive reduces the coating surface coefficient of friction, thus allowing incident objects to pass easily against the coating surface without damaging the surface. When combined with the monosize polymeric particles in certain relationships, the combination aids in achieving the dual benefits of scuff and scratch resistance of the direct coatings.

When used, the polysiloxane dispersion or emulsion is present in the coating composition in an amount of about 0.5 to about 5 weight percent, preferably about 1.25 to about 3.5 weight percent, and more preferably about 2 to about 2.5 weight percent based on total weight of components in the coating composition.

In approaches, the coating compositions herein have a unique coefficient of friction when including the combination of monosize particles and the polysiloxane dispersion. For instance, when applied using an 8 mil Bird applicator drawdown and cured for 1 week at 23° C. and 50% relative humidity, a dried coating from the coating compositions herein may have a static coefficient of friction (COF) of about 0.75 to about 1.5, preferably less than 1.25, and even more preferably less than 1.1 as measured by ASTM D1894-14. In other approaches, a dried coating from the coating compositions herein may also have a kinetic coefficient of friction (COF) of about 0.25 to about 0.75, preferably less from about 0.35 to 0.55, as measured by ASTM D1894-14. While not being bound by theory, it is believed that the polysiloxane slip additive, with or without a softer wax particle results in surface with a lower coefficient of friction, allowing incident objects to contact the surface without damaging the surface to a degree that would leave a mark. Together with the relatively round, hard polymeric particle, the result is a surface that is more resistant to scuffs.

Film Forming Binder Resin

The coating compositions herein also include at least one film-forming binder or film-forming binder resin. In some approaches, the film-forming binder is an acrylic, styrene acrylic, or vinyl acrylic polymer or copolymer and/or blends thereof including ethylenically unsaturated monomers with at least carboxylic acid, alkyl acrylate, alkyl methacrylate, or acetate moieties. The copolymer may include as polymerizable units in a polymer backbone vinyl monomers and acrylic monomers such as at least vinyl acetate, alkyl acrylate, alkyl methacrylate, acrylic, styrene acrylic, and combinations thereof. Alkyl groups of the monomers may have linear or branched chain lengths from C1 to C8 and, in some approaches, are ethyl, propyl, isopropyl, butyl, ethyl hexyl, and the like side groups.

In some approaches, vinyl monomers are selected from the group consisting of vinyl esters, vinyl aromatic hydrocarbons, vinyl aliphatic hydrocarbons, vinyl alkyl ethers and mixtures thereof. Examples of vinyl esters that may be used include vinyl acetate, vinyl propionate, vinyl laurate, vinyl pivalate, vinyl nonanoate, vinyl decanoate, vinyl neodecanoate, vinyl butyrates, vinyl benzoates, and vinyl isopropyl acetates. Examples of vinyl aromatic hydrocarbons that may be used include styrene, methyl styrenes and other lower alkyl styrenes, chlorostyrene, vinyl toluene, vinyl naphthalene and divinyl benzene. Examples of vinyl aliphatic hydrocarbons that may be used include vinyl chloride and vinylidene chloride as well as alpha olefins such as ethylene, propylene, isobutylene, as well as conjugated dienes such as 1,3 butadiene, methyl-2-butadiene, 1,3-piperylene, 2,3-dimethyl butadiene, isoprene, cyclohexene, cyclopentadiene, and dicyclopentadiene. Examples of vinyl alkyl ethers that may be used include methyl vinyl ether, isopropyl vinyl ether, n-butyl vinyl ether, and isobutyl vinyl ether.

Acrylic monomers suitable for use in the present compositions may include any compounds having acrylic functionality. Suitable acrylic monomers are selected from the group consisting of alkyl (meth)acrylates, acrylic acids, as well as aromatic derivatives of (meth)acrylic acid, acrylamides, acrylonitrile, or combinations thereof. Typically, the alkyl (meth)acrylate monomers (also referred to herein as "alkyl esters of (meth)acrylic acid") will have an alkyl ester portion containing from 1 to 12, in some approaches, about 1 to 8, in yet other approaches, about 1 to 6, and in yet further approaches, 1 to 4, carbon atoms per molecule.

Suitable acrylic monomers may include, for example, methyl (meth)acrylate, ethyl (meth)acrylate, butyl (meth)acrylate, propyl (meth)acrylate, 2-ethyl hexyl (meth)acrylate, cyclohexyl (meth)acrylate, decyl (meth)acrylate, isodecyl (meth)acrylate, benzyl (meth)acrylate, isobornyl (meth)acrylate, neopentyl (meth)acrylate, 1-adamantyl methacrylate and various reaction products such as butyl, phenyl, and cresyl glycidyl ethers reacted with (meth)acrylic acid, hydroxyl alkyl (meth)acrylates, such as hydroxyethyl and hydroxypropyl (meth)acrylates, amino (meth)acrylates, as well as acrylic acids such as (meth)acrylic acid, ethacrylic acid, alpha-chloroacrylic acid, alpha-cyanoacrylic acid, crotonic acid, beta-acryloxy propionic acid, and beta-styryl acrylic acid.

In some approaches, the acrylic polymer of the film forming binder may include substantial amounts of a vinyl acetate monomer. The acrylic copolymer may also include about 90 to about 100 weight percent of linear or branched alkyl acrylate or alkyl methacrylate monomer, and in other approaches, about 94 to about 100 weight percent of a linear or branched alkyl acrylate or alkyl methacrylate monomer. In some approaches, the copolymer may further include substantial amounts of acrylic acid monomer.

The film-forming binder may also include optional ketone-functional vinyl monomer units. In some approaches, these vinyl monomer units may be derived from diacetone acrylamide, diacetone (meth)acrylamide, acetoacetoxyethyl (meth)acrylate, acrolein, methacrolein, vinylacetoacetate, crotonaldehyde, 4-vinylbenzaldehyde, vinyl alkyl ketones, acrylamide-pivalaldehyde, methacrylamidopivalaldehyde, 3-acryl amidomethyl-anisaldehyde, diacetone acrylate, acetonyl acrylate, diacetone methacrylate, acetoacetoxyethylmethacrylate, 2-hydroxypropylacrylate acetylacetate, and butanediolacrylate acetylacetate and the like, and combinations thereof.

In some approaches, the film-forming binder may include about 0 to about 20 weight percent of the optional ketone-functional monomer units, and in other approaches, about 0 to about 12 weight percent, and in yet other approaches, about 1 to about 16 weight percent or 2 to about 12 weight percent as a percentage of the acrylic phase.

The film-forming binder resins herein may also include other optional monomers polymerized into the polymer backbone as needed for a particular application. For instance, the copolymer may further include ureido monomers, amino monomers, sulfonate monomers or surfactants, silane monomers, phosphate monomers or surfactants, carboxyl monomers or surfactants, and combinations thereof. In some approaches, the copolymer may further include vinyl monomers such as allyl imidazolidinone, allyl acetoacetates, allyl epoxies, epoxy acrylates, carbonyl monomers, other sulfonates, other phosphonates, vinyl phosphonate, allyl hydroxypropyl sodium sulfonate, allyloxy hydroxypropyl sodium sulfonate, and combinations thereof as needed for a particular application. In some approaches, for instance, the other monomers may each be present in the acrylic copolymer in amounts up to about 10 weight percent, and in other approaches, about 0.1 to about 5 weight percent, in other approaches, about 0.5 to about 2 weight percent, but the amounts may vary depending on the particular application. In other approaches, the other or additional monomers may each be included in the polymer backbone in amounts less than about 1 weight percent.

The film-forming binder of the coating composition is disclosed herein is present in a film-forming amount. That is, the coating compositions disclosed herein, in some approaches, may have above 10 percent film forming binder solids, preferably above 15 percent film forming binder solids based on the total components of the coating composition. The coating compositions disclosed herein, in some approaches, may have up to 30 percent film forming binder solids, preferably up to 25 percent film forming binder solids, preferably up to about 22 percent based on the total components of the coating composition.

In some approaches, the compositions may include more than one binder. In preferred approaches, the binder is a copolymer that includes at least styrene and acrylic functional units.

Opacifying Pigment and Additional Extender Particles

The waterborne coating compositions of the present disclosure may also include optional opacifying pigments or additional extender particles. If included, suitable pigment particles or inorganic particles used in the polymer compositions or complexes or the water-borne coating composition of the present disclosure may be titanium dioxide ($TiO_2$), non-encapsulated or raw zinc oxide ($ZnO_2$), calcium carbonate ($CaCO_3$), talc, clay materials, aluminum oxide, silicon dioxide, magnesium oxide, zinc sulfate, combinations thereof, or other known pigment or inorganic particles suitable for paints and other coatings. In some approaches, the pigment or inorganic particle is titanium dioxide, which may comprise anatase titanium dioxide or rutile titanium dioxide, or a mixture of the two. In other approaches, the pigment or inorganic particle comprises rutile titanium dioxide, to the exclusion of anatase titanium dioxide. In some approaches, the rutile titanium dioxide is surface treated with an inorganic oxide, such as silica ($SiO_2$). Generally, the opacifying pigments, such as titanium dioxide, have a particle size less than a micron, such as about 0.2 to about 0.3 microns in diameter and provided in powder form, or in an aqueous slurry. An example of a titanium dioxide that is suitable for use is Ti-Pure® R-706, which is commercially available from E.I. du Pont de Nemours and Company. Ti-Pure® R-706 titanium dioxide is a rutile titanium dioxide that is surface treated with silica.

In some approaches, the waterborne compositions herein may include about 10 to about 30 weight percent of titanium dioxide, about 15 to about 20 weight percent, or about 18 to about 25 weight percent of titanium dioxide for extra white formulations. In other approaches, the compositions may include about 5 to about 10 weight percent of titanium dioxide for deep formulations or about less than about 5 weight percent for ultra deep formulations. In other approaches, the waterborne coating compositions herein may include a pigment present in an amount of about 3 to about 60 PVC, preferably about 10 to about 50 PVC, and more preferably, about 20 to about 45 PVC. The amount of pigment may vary depending on the application. For instance, the PVC of architectural exterior coatings may be about 10 to about 50, the PVC of masonry coatings may be about 10 to about 40, the PVC of stains may be about 10 to about 40, and extra while formulations may contains more PVC, such as about 20 to about 45.

Optional Additives

The water-borne coating compositions of the present disclosure may also include other optional additives as needed for typical applications. For instance, the water-borne coating composition of the present disclosure is produced using techniques known to those skilled in the art of manufacturing paint or coatings. In addition to the film-forming binder and the other particles or components discussed herein, the water-borne coating compositions herein may contain conventional additives including, but not limited to an extender, a wet-state preservative, a rheology modifier (preferably, a hydrophobically modified urethane (HEUR), a hydroethylcellulose (HEC), a hydroxy alkali swellable emulsion (HASE), or combination thereof), a colorant, a mildewcide, a surfactant, a dispersant, a defoamer, a coalescent, a plasticizer, an anti-settling agent, a pH modifier, a UV absorbent, a crosslinker, thickeners, coalescing aids, biocides, anti-foaming agents, freeze-thaw additives, matting agents, and the like. It should also be appreciated that in addition to the opacifying pigment, small amounts of other pigments or colorants may be used to provide desired coloration or to confer other optical effects. In some approaches, the coating compositions herein may include a rheology modifier, preferably a hydrophobically modified urethane (HEUR), a hydroethylcellulose (HEC), a hydroxy alkali swellable emulsion (HASE), or combination thereof.

In some approaches, the coating compositions may be substantially free of alkylphenol ethoxylates (APEOs) additives. For purposes of the compositions herein, substantially free of APEO additives generally means about 1 wt % or less based on the total components of the coating composition, about 0.5 wt % or less, about 0.25 wt % or less, about 0.01 wt % or less, or no intentionally added APEOs.

If needed for a particular application, the compositions may include inorganic or mineral extender matting agents such as calcium carbonate, silicates, diatomaceous earth, clay, asbestine, barytes, silica, mica, and microspheres (glass, ceramic, or polymeric, and can be filled or hollow); however, it is preferred that the coating compositions herein are substantially free of such inorganic extenders or matting agents. For purposes of the compositions herein, substantially free of inorganic extenders or matting agents generally means about 1 wt % or less, about 0.5 wt % or less, about 0.25 wt % or less, about 0.1 wt % or less, or none.

In approaches or embodiments, the water-based coating compositions herein may further include an antimicrobial agent, which is an additive that provide microbistatic or microbicidal properties to the coating composition. If included, the compositions may include about 0 to about 2.0 weight percent of an antimicrobial agent, preferably about 0.2 to about 1.5 weight percent of a antimicrobial agent based on the total weight of the coating composition. In some embodiments, coating compositions of the present disclosure include more than one antimicrobial agents. Suitable antimicrobial agents include, but are not limited to, one or more of methyl 2-benzimidazolecarbamate (BCM), 3-iodo-2-proynyl butyl carbamate (IPBC), zinc pyrithione, sodium pyrithione, carbendazim, chlorothalonil, an isothiazolinone, tetrachloroisophthalonitrile, 1,2-benzisothiazolin-3-one (BIT), sodium omadine, zinc omadine, zinc oxide, tetrahydro-3,5-dimethyl-2H-1; 3,5-thiadiazine-2-thione; 5-hydroxymethoxymethyl-1-AZA-3; 2-n-octyl-4-isothiazolin-3-one; 1-(3-chloroallyl)-3,5,7-triaza-1-azoniaadamantane chloride, octylisothiazolinone, dichlorooctylisothiazolinone, n-butyl-benzisothiazolinone, and the like, or combinations thereof.

The present disclose provides for an extender package suitable for addition to a coating composition, the extender package comprising the monosize polymeric particles and micronized or spray-melt wax particles of the present disclosure. The ratio in amount of the first and second extender particles in the extender package, and the amount of the extender package to be added to a coating composition, is determined such that the coating composition, upon mixing, will include desired amounts of the first extender particles and second extender particles.

Glossary of Terms

Additives refer to a general category of components or other raw materials that may be added to the coatings herein to promote various properties. Examples include, but are not limited to, surfactants, defoamers, biocides, mildewcides, algaecides, thickeners, anti-settling agents, pH buffers, corrosion inhibitors, driers, and/or anti-skinning agents.

Glass Transition Temperature or Tg generally refers to a temperature region where an amorphous polymer transitions from a hard, glassy material to a softer, rubbery material. Typically, this transition is reversible. Tg is measured by differential scanning calorimetry (DSC) and/or dynamic mechanical analysis (DMA), such as with a TA Instruments Q200 differential scanning calorimeter or the like instrument. To measure Tg using DSC, a sample deposited on a panel first is baked in a Fisher ISOTEMP™ electric oven for 20 minutes at 149° C. (300° F.) to remove volatile materials. After cooling to room temperature, samples are scraped from the panels, weighed into standard sample pans and analyzed using the standard DSC heat-cool-heat method. The samples were equilibrated at −60° C., then heated at 20° C. per minute to 200° C., cooled to −60° C., and the heated again at 20° C. per minute to 200° C. Glass transitions are calculated from the thermogram of the last heat cycle. The glass transitions are measured at the inflection point of the transition. Preferably, Tg is measured through DSC.

The term "no intentionally added" with reference to an additive or material in a composition means that the composition as formulated does not include the additive or material except trace amounts from manufacturing or background amounts from the environment, and that any components of the composition themselves do not include the additive or material except trace amounts from manufacturing or background amounts from the environment.

If used herein, Volatile Organic Compound or VOC generally refers to organic compounds that have a high vapor pressure at room temperature. In many cases, VOCs are compounds with a vapor pressure of greater than about 0.1 mm of Hg. VOC as reported herein is measured according to ASTM D2369-90 and is the weight of the VOC per volume of the coating solids in grams/L. As used herein, VOC may also mean anything that elutes from a gas chromatograph test performed under ASTM D2369-90 before methyl palmitate.

As used herein, without the need for, without substantial levels of, in the absence of, or substantially free of, substantially none, substantially no, or free-of generally means (unless apparent from the context of the discussion) the coating compositions herein have less than about 1 weight percent, in other approaches, less than about 0.5 weight percent, in other approaches, less than about 0.2 weight percent, and in yet other approaches, none of the particular component or additive. As used herein, essentially free of means no intentionally added amount of an identified material.

When referring to a polymer, oligomer, or copolymer, and a particular monomer or reactant is described, it is also intended that such discussion refers to the resulting monomer unit or associated repeating unit when polymerized within the polymer, oligomer, or copolymer. Likewise, when a monomer unit or repeating unit of a polymer, oligomer, or copolymer is described, the corresponding monomer or reactant is also contemplated by this disclosure. As used herein, the terms polymer or copolymer are interchangeable unless the context of discussion suggests otherwise. A polymer or copolymer typically have a weight average molecular weight above about 40,000 and an oligomer typically has a molecular weight below 500.

As used herein, (meth)acrylate monomer(s) or monomer unit(s) include both acrylate monomer(s) and monomer unit(s) and methacrylate monomer(s) and monomer unit(s) as well as functionalized (meth)acrylate monomer(s) or monomer unit(s) suitable for incorporation into the functionalized polymers or oligomers disclosed herein. Functional moieties may also bear other crosslinking groups, photo-reactive groups, anti-fouling agents, light absorbers, anti-corrosion agents, and the like as needed for a particular application or use.

As used herein, functionalized, functionality, or functional group means a group or moiety of a larger molecule or polymer reactive with another group or atom.

Opacity or hiding (in some approaches) generally refers to the ability of a film to scatter light based on the thickness of the film. The Opacity is often expressed as S/mil and may be in the form of Kubelka-Munk scattering coefficients as determined using a modification of ASTM D 2805-70 as described in J. E. Mchutt and H. L. Ramsay in American Paint and Coatings Journal, April, 1988, p. 46 by the weight drawdown method, which is incorporated herein by reference.

Sheen may also sometimes be referred to as gloss. In a coating, a gloss finish indicates that the surface which has a coating applied to it (i.e., is finished) appears to have a shiny or glass-like surface. In contrast, a coating that has little to no gloss is a "flat" finish. The gloss of a surface is described as the reflection of light from the surface that is independent of color. ASTM D523 may be used to measure sheen. The prescribed angle at which light is reflected off the surface may vary, but for the purposes of this disclosure to measure 85 Sheen, is measured at 85° relative to the surface reflecting the light. ASTM D523 may also be used to describe 60 Gloss, which is measured at 60° relative to the surface reflecting the light. Gloss may refer to the gloss intensity measured at 20, 60, or 85 degrees and is determined according to ASTM D523.

A coating refers to any decorative or protective layer formed by applying a thin film of a coating composition herein to a substrate. Coating compositions include any paint, stain, laquers, etc. A coating composition may contain a solvent (which can include a volatile component derived from a petroleum distillate for a solvent-based paint, or a low VOC, or no-VOC, or water for a water-based paint or composition), a binder polymer, and optionally, a pigment, fillers (such as an extender or a plurality of extenders of different sizes) and one or more additives, which may impart different functionality to the paint or final coating.

A "paint" refers to a coating composition including pigment and film-forming binder that, when applied to form a thin (e.g., approximately 100 µm) wet thickness coating film on a freshly-sanded smooth wood surface will, when dried, hide or substantially hide the wood grain and will present a new surface with its own appearance.

A "stain" refers to a coating composition including optional pigment and film-forming binder that, when applied to form a thin (e.g., approximately 100 µm) wet thickness coating film on a freshly-sanded smooth wood surface will, when dried, does not hide the wood grain of the wood surface.

Pigment volume concentration or PVC refers to a number that represents the volume of pigment and extenders (including inorganic and polymeric extenders) compared to the volume of all solids. In the field of paints and coatings, PVC is a useful measure because the binder (non-pigment) acts as the material to unite all the pigment and other raw materials into the paint and the PVC value ensures there is enough binder to enable the paint or coating to adhere properly to whatever it has been applied over in addition to containing all of the other components of the paint or coating. If a paint or coating has no pigment at all, it will usually be very glossy and have a PVC of zero. An example is clear gloss paints. Flat paints commonly have a very high pigment loading and have high PVCs (usually in the range from about 55% up to about 80%). Another non-limiting exemplary range of PVC in which pigment can be loaded is from about 60% to about 75%. Primers and undercoats vary from 30% to about 50% PVC as do semi-gloss, satin, and low sheen paints. Additionally, it is thought that the lower the PVC of a paint is, the better its mechanical properties (such as tensile strength, and consequently, exterior durability) will be. PVC may be expressed as a percentage. For example, if a coating has a PVC of 30, then 30% of the total binder/pigment blend is pigment, and 70% is binder solids on a volume basis.

Critical pigment volume concentration or CPVC is the point at which there is just enough binder to wet (entirely surround) the pigment particles. As PVC reaches and then increases above CPVC, mechanical properties of the paint or coating deteriorate. Above CPVC, with insufficient binder to satisfy pigment surface and fill interstitial spaces, air is introduced into the film resulting in a decrease in film integrity. However, above CPVC, increased air and pigment interface results in a substantial boost in pigment scattering efficiency. A film below the CPVC has excess resin and may exhibit a smooth surface that reflects light or appears to be glossy. As the PVC of a film approaches CPVC, the film will appear to be flatter, although the aforementioned loss of mechanical properties may become a limiting factor in how close to CPVC a paint producer wishes to provide the PVC.

Burnish refers to the ability of a coating to retain its gloss value after being subjected to rubbing or polishing, such as abrasion. Both dry burnish and wet burnish may be measured. Dry burnish refers to abrasion by rubbing with a dry cheesecloth as measured according to ASTM D6736-08. Results are reported as the % loss of 85 Sheen. Wet burnish refers to abrasion according to ASTM D6736-08 with abrasion by a wet melamine sponge for 50 cycles in place of cheesecloth, with results reported as the % loss of 85 Sheen.

Contrast Ratio is calculated as $Y_{black}/Y_{white}$ and is the ratio of the reflectance of a film on a black substrate to that of an identical film on a white substrate. ASTM D2805-11 provides for the measurement of contrast ratio. $Y_{black}$ represents the reflectance value of a coating and measures the ability of a coating to cover against a black background. $Y_{white}$ represents the reflectance value of a coating and measures the ability of a coating to reflect light against a white background.

Scrub or scrub resistance refers to the ability of the surface of a coating film or paint film to resist being worn away or to maintain its original appearance when rubbed with or against an abrasive surface, typically during cleaning. Scrub resistance can be evaluated through ASTM D2486-96 (Standard Test Method for Scrub Resistance of Wall Paints).

Washability refers to the relative ease of removing dirt, soil, discolorations, and the like, from a dried film applied to a substrate surface, typically an interior architectural surface such as a wall, for example. The soil or dirt is typically removed by washing with abrasive and/or non-abrasive cleaning compositions. To measure washability, a standard test method, ASTM D3450-00 (Standard Test Method for Washability Properties of Interior Architectural Coatings) is used. The terms washability and stain resistance are used interchangeably herein.

Static and Dynamic Coefficient of Friction is measured according to ASTM D1894-14 on a coating composition drawdown generated on release paper using an 8 mil Bird applicator cured for one week at 23° C. and 50% relative humidity, with the mean of five replicates reported.

Rubber mar refers to the tendency of a coating to stain when rubbed with a rubber object. Rubber mar resistance of a coating was measured on a drawdown made using 4 mil (0.10 mm) Bird bar, with the coating allowed to cure by air drying for 10 minutes followed by 30 minutes in a 120° F. oven. A black rubber doorstop, black cabinet castor wheel, or a black block resistance rubber stopper is then dragged across a portion of the coating sample at a 45° angle in a straight line. Each mark is evaluated visually on a scale of 1 (most mar) to 10 (no/least mar). After marking, each sample is regraded after wiping with a dry paper towel and wiping with a wet paper towel. The rating scale was from 1-10, with guidepost grades as follows:

TABLE 1

Grading Scale for Rubber Mar Test

| Rating | Description |
|---|---|
| 10 | >90% of area appears white. Coating appears nearly white under marked area. |
| 7 | Approx. 70% of marked area appears white. Coating has slight black mark, but nearly white under marked area. |
| 5 | Approx. 50% of marked area appears white. |
| 3 | Approx. 70% of marked area appears black. |
| 1 | >90% of marked area appears black. Coating has heavy, black, opaque rubber mark. |

Plastic mar refers to the tendency of a coating to show a visible mark when struck with a dark plastic object. Plastic mar was measured by dropping through a plastic tube twenty one-inch black, nylon balls from a height of four feet onto a coated metal substrated held at 45° to the dropping angle. Samples were assessed on a scale of 1 (no damage) to 10 (heavy damage) of the coated surface.

Certain terminology is used herein for convenience only and is not to be taken as a limitation on the present disclosure.

EXAMPLES

The following examples demonstrate the preparation of waterborne compositions such as those described herein above, as well as non-inventive examples for comparison. The examples are intended to be representative of the polymers that can be made and are not intended to limit the scope of the present disclosure to the specific illustrative examples disclosed below. All percentages, ratios, and amounts in this disclosure and the Examples are by weight unless the context of discussion herein suggests otherwise.

Example 1

Coating compositions configured for architectural paint applications were evaluated for various performance features including rubber mar resistance, gloss/sheen, washability, scrubs, dry burnish, and/or wet burnish. The coating compositions included an acrylic or styrene-acrylic latex as a film forming binder with other conventional additives for an architectural paint, and the extenders shown in Table 2. The coating compositions evaluated for this Example included no other inorganic extender particles (glass beads, clays, and/or silica).

TABLE 2

Extenders in Inventive Coating Compositions(wt %)

| Ingredient | Inventive 1, wt % | Inventive 2, wt % | Inventive 3 |
|---|---|---|---|
| Monosize polymeric particles | 7.4% | 5.9% | 9.5% |
| Polysiloxane dispersion[1] | 0.4% | 2.0% | 1.8% |
| Wax particles | 6.9% | 3.9% | — |

The monosize polymeric particles were polymethacrylate particles having a D90 particle size of 20 microns, a particle size coefficient of variation (CV) of less than about 5% (standard deviation/average bead diameter×100), a glass transition temperature of about 130° C., a particle density of 1.2 g/cm3, and a Shore D hardness of at least 90 (ASTM D2240-15). The polysiloxane dispersion was an ultra-high molecular weight silicone dispersion (Dowsil 52, The Dow Chemical Company). The wax particles were a spray-melt, high density polyethylene particles having a mean particle size of about 4 to about 6 microns, a melting point of 110° C., and a density of 0.94 g/cm³.

Performance testing is provided in Table 3 below.

TABLE 3

Comparative Performance

| | Inventive 1 | Inventive 2 | Inventive 3 | Comparative Sample 1 | Comparative Sample 2 | Comparative Sample 3 |
|---|---|---|---|---|---|---|
| Description | Deep Base | Deep Base | Extra White Base | Emerald Interior Acrylic Latex Paint, Flat Extra White[2] | Behr Ultra Scuff Defense Flat, Ultra White[3] | Valspar Signature Interior Paint & Primer, Flat Extra White[4] |
| Gloss/Sheen 60 (ASTM D323) | 3.4 | 2.6 | 6.6 | 2.5 | 3.1 | 4.1 |
| Gloss/Sheen 85 (ASTM D323) | 2.4 | 2.3 | 5.1 | 2.1 | 2.8 | 4.3 |
| Rubber Mar (block/door stop/plastic wheel) | 9/9/8 | 8/9/8 | 10/7/10 | 1/8/1 | 2/9/2 | 2/8/2 |
| Washability (ASTM D4828-94, average of all stains)[5] | 2.2 | 2.2 | 3.1 | 3.6 | 3.1 | 3.2 |
| Scrubs (ASTM D2486-96) | 482 | 470 | 635 | 540 | 1050 | 1200 |
| Dry Burnish % 85sheen change (ASTM D6736-08) | 33.3 | 38.9 | 10.3 | 65.6 | 21.8 | 47.9 |
| Wet Burnish % 85sheen change (ASTM D6736-08) | 49.2 | 61.9 | 93.3 | 95.1 | 53.8 | 91.8 |
| Static COF (ASTM D1894-14) | 0.84 | — | — | — | 1.27 | — |
| Kinetic COF (ASTM D1894-14) | 0.35 | — | — | — | 0.78 | — |

[2]The Sherwin-Williams Company, Cleveland, Ohio.
[3]Behr Paint Company, Santa Ana, California.
[4]The Sherwin-Williams Company, Cleveland, Ohio.
[5]Data reported is washability after 50 cycles, using 10 mL Formula 409 liquid cleanser added to dry sponge. Soilants tested include pencil, crayon, ball point pen, lip stick, mineral-oil borne soilant per ASTM D3450.

The data shows that the inventive compositions have exceptional rubber mar resistance as comparative samples, similar scrubs to at least one comparative, and similar or improved dry burnish and wet burnish to the comparative samples. The inventive compositions have the same or less sheen than comparative paints marketed for scuff-resistance (Comparative Samples 2 & 3). Inventive composition 1 has lower coefficient of friction (is more slippery) than Comparative Sample 2.

Unless otherwise specified, all measurements herein are made at 23±1° C. and 50% relative humidity. The dimensions and values disclosed herein are not to be understood as being strictly limited to the exact numerical values recited. Instead, unless otherwise specified, such as dimension is intended to mean both the recited value and a functionally equivalent range surrounding that value. All ranges noted are intended to mean any endpoint within that range. For example, a dimension disclosed as "40 mm" is intended to mean "about 40 mm".

Illustrative embodiments have been described, hereinabove. It will be apparent to those skilled in the art that the above compositions and methods may incorporate changes and modifications without departing from the general scope of this disclosure. It is intended to include all such modifications and alterations within the scope of the present disclosure. Furthermore, to the extent that the term "includes" is used in either the detailed description or the claims, such term is intended to be inclusive in a manner similar to the term "comprising" as "comprising" is interpreted when employed as a transitional word in a claim.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

LIST OF EMBODIMENTS

The following is an exemplary list of preferred embodiments to the present disclosure. While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

Embodiment 1: A water-based coating composition comprising: a film-forming polymer binder; a water-based carrier liquid; and monosize polymeric particles having a particle size coefficient of variation (CV) of about 50 percent or less and a Shore D hardness of at least about 75 as measured by ASTM D2240-15; and a polysiloxane dispersable in water; and the coating composition having a pigment volume concentration (PVC) of about 10 to about 50.

Embodiment 2: The coating composition of Embodiment 1, wherein the monosize polymeric particles have a round cross-section.

Embodiment 3: The coating composition of Embodiment 2, wherein a cross-section of the monosize polymeric particles has an aspect ratio from 1:1 to 3:1, and preferably are substantially spherical.

Embodiment 4: The coating composition of any one of the preceding Embodiments, wherein the $D_{50}$ of the monosize polymeric particles is from 5 to 30 microns.

Embodiment 5: The coating composition of any one of the preceding claims, wherein the monosize polymeric particles are present in the coating composition in an amount of at least 4 weight percent based on the total weight of components in the coating composition.

Embodiment 6: The coating composition of any one of the preceding Embodiments, wherein the monosize polymeric particles are present in the coating composition in an amount of about 4 to about 15 weight percent or about 5 to about 12 weight percent or 7 to about 11 weight percent based on the total weight of components in the coating composition.

Embodiment 7: The coating composition of any one of the preceding Embodiments, wherein the monosize polymeric particles have a median particle size of about 5 to about 30 microns, preferably about 10 to about 30 microns, more preferably about 15 to about 22 microns, and most preferably about 18 to about 22 microns.

Embodiment 8: The coating composition of any preceding Embodiment, wherein the monosize polymeric particles include a polyalkyl (meth)acrylate, preferably a poly methylmethacrylate.

Embodiment 9: The coating composition of any one of the preceding Embodiments, wherein the monosize polymeric particles have a glass transition temperature (Tg) of at least 100° C. and no more than 180° C. as measured by Differential Scanning Calorimetry.

Embodiment 10: The coating composition of any one preceding Embodiments, wherein the monosize polymeric particles have a glass transition temperature (Tg) of at least about 100° C., preferably about 110° C. to about 180° C., more preferably about 100° C. to about 150° C., and most preferably about 120° C. to about 140° C.

Embodiment 11: The coating composition of any one of the preceding Embodiments, wherein the polysiloxane is present in the coating composition in an amount of at least 0.25 wt. % to at most 5 wt. % based on total weight of components in the coating composition.

Embodiment 12: The coating composition of any one of the preceding Embodiments, wherein the coating composition further includes an opacifying inorganic pigment, preferably titanium dioxide.

Embodiment 13: The coating composition of any one of the preceding Embodiments, wherein the opacifying pigment is present in the coating composition in an amount of no more than 10 weight percent based on the total components of the coating composition.

Embodiment 14: The coating composition of any one of the preceding claims, further including wax particles having a median particle size of 1 to 6 microns.

Embodiment 15: The coating composition of Embodiment 14, wherein the wax particles are micronized or spray melt particles.

Embodiment 16: The coating composition of any one of Embodiments 14 to 15, wherein the wax particles are polyethylene.

Embodiment 17: The coating composition of any one of Embodiments 14 to 16, wherein the wax particles are high density polyethylene.

Embodiment 18: The coating composition of any one of Embodiments 14 to 16, wherein the wax particles are low density polyethylene.

Embodiment 19: The coating composition of any one of Embodiments 14 to 20, wherein the wax particles have a Shore D hardness less than about 100, less than about 90, or preferably, less than about 80.

Embodiment 20: The coating composition of any one of Embodiments 14 to 19, wherein the wax particles include a polyamide, a polyamideimide, a polytetrafluoroethylene, a poly vinyl acetate, or a butyl styrene polymer, or a natural wax, or a MONTAN wax.

Embodiment 21: The coating composition of any one of Embodiments 14 to 20, wherein the wax particles are present in an amount of about 1 to about 7 weight percent, preferably about 2 to about 5 weight percent, and more preferably about 2.5 to about 4 weight percent based on the total weight of components in the coating composition.

Embodiment 22: The coating composition of any one of Embodiments 14 21, wherein the wax particles have a melting point of less than about 140° C., preferably about 90° C. to about 135° C., more preferably about 105° C. to about 125° C., and most preferably about 108° C. to about 115° C.

Embodiment 23: The coating composition of any one of Embodiments 14 to 22, wherein the coating composition includes a weight ratio of the monosize polymeric particles to the wax particles of about 2:1 to about 1.5:1 or about 1.05:1 to about 1:1.

Embodiment 24: The coating composition of any one of Embodiments 14 to 23, wherein a $D_{50}$ particle size of the monosize polymeric particles is larger than the $D_{50}$ particle size of the wax particles.

Embodiment 25: The coating composition of any one of Embodiments 14 to 24, wherein the $D_{50}$ particle size of the monosize polymeric particles is at least 2 times larger, at least 3 times larger, and/or at least 4 times larger than the $D_{50}$ particle size of the wax particles.

Embodiment 26: The coating composition of any one of the preceding Embodiments, wherein the coating composition further includes an inorganic extender.

Embodiment 27: The coating composition of any one of the preceding Embodiments, wherein the polysiloxane is present in the coating composition in an amount of about 0.25 to about 5 weight percent, preferably about 1.25 to about 3.5 weight percent, and more preferably about 2 to about 2.5 weight percent based on total weight of components in the coating composition.

Embodiment 28: The coating composition of any one of the preceding Embodiments, wherein when coated on a substrate by drawdown using a 4 mil Bird bar and allowed to cure for about 10 minutes at room temperature followed by 30 minutes at 50° C., the cured coating has a gloss of less than about 5 and/or a sheen of less than about 5 as measured by ASTM D523.

Embodiment 29: The coating composition of any of the preceding Embodiments, wherein when coated on a substrate by drawdown using a 4 mil Bird bar and allowed to cure for about 10 minutes at room temperature followed by 30 minutes at 50° C., the cured coating has a gloss of less than about 10 and/or a sheen of less than about 10 as measured by ASTM D523.

Embodiment 30: The coating composition of any one of Embodiments 1 to 29, wherein when coated on a substrate by drawdown using a 4 mil Bird bar and allowed to cure for about 10 minutes at room temperature followed by 30 minutes at 50° C., the cured coating has a gloss of greater than about 10 and/or a sheen of greater than about 10 as measured by ASTM D523.

Embodiment 31: The coating composition of any one of Embodiments 1 to 30, wherein the latex binder is a (meth) acrylic latex, a styrene-acrylic latex, a urethane modified acrylic latex, or combinations thereof.

Embodiment 32: The coating composition of any one of Embodiments 1 to 31, wherein the coating composition further includes adipic dihydrazide.

Embodiment 33: The coating composition of any one of Embodiments 1 to 32, wherein a pigment volume concentration (PVC) of the coating composition is between about 45 to about 55, or in an amount of about 30 to about 45.

Embodiment 34: The coating composition of any one of Embodiments 1 to 25 or 27 to 33, wherein the coating composition is substantially free of inorganic extenders.

Embodiment 35: The coating composition of any one of Embodiments 1 to 34, wherein the coating composition has a weight per gallon of about 7 to about 11 lbs/gallon.

Embodiment 36: The coating composition of any one of Embodiments 1 to 35, wherein the coating composition includes a rheology modifier, preferably one of a hydrophobically modified urethane (HEUR), a hydroethylcellulose (HEC), a hydroxy alkali swellable emulsion (HASE), or combination thereof.

Embodiment 37: The coating composition of any one of Embodiments 1 to 36, wherein the coating composition includes a surfactant.

Embodiment 38: The coating composition of any one of Embodiments 1 to 37, wherein the coating composition contains 1 wt % or less, about 0.5 wt % or less, about 0.25 wt % or less, about 0.01 wt % or less, or no intentionally added alkylphenol ethoxylates (APEOs) based on the total weight of components of the coating composition.

Embodiment 39: The coating composition of any one of Embodiments 1 to 38, wherein the coating composition has less than about 250 g/L VOC, preferably less than about 150 g/L VOC, more preferably less than about 50 g/L VOC, more preferably less than 2 about 5 g/L VOC, and even more preferably less than about 10 g/L VOC, or most preferably, essentially free of VOCs.

Embodiment 40: The coating composition of any preceding Embodiment, wherein the coefficient of variation (CV) of the monosize polymeric particles is about 40 percent or less, about 30 percent or less, about 20 percent or less, about 15 percent or less, about 10 percent or less, or about 5 percent or less.

Embodiment 41: The coating composition of any one of Embodiments 1 to 40, when applied using an 8 mil Bird applicator drawdown and cured for 1 week at 23° C. and 50% relative humidity, the coating composition has a static coefficient of friction (COF) of about 0.75 to about 1.5, preferably less than 1.25, and even more preferably less than 1.1 as measured by ASTM D1894-14.

Embodiment 42: A coating formed from the coating composition of any one of Embodiments 1 to 41 wherein, when applied using an 8 mil Bird applicator drawdown and cured for 1 week at 23° C. and 50% relative humidity, the coating composition has a kinetic coefficient of friction (COF) of about 0.25 to about 0.75, preferably less from about 0.35 to 0.55, as measured by ASTM D1894-14.

Embodiment 45: A cured coating comprising:
the coating composition of any one of Embodiments 1 to 42, wherein when the coating composition is cured for 24 hours;
the cured coating has a gloss of less than about 5 and/or a sheen of less than about 5 pursuant to ASTM D523 and a static coefficient of friction (COF) of about 0.75 to about 1.5, preferably less than 1.25, and even more preferably less than 1.1 as measured by ASTM D1894-14, or a kinetic coefficient of friction (COF) of about 0.25 to about 0.75, preferably less from about 0.35 to 0.55, as measured by ASTM D1894-14.

Embodiment 46: A cured coating comprising:
the coating composition of any one of Embodiments 1 to 45 applied to a substrate and cured for 24 hours; wherein the cured coating has a 60 Gloss of less than about 5 and an 85 Sheen of less than about 5 per ASTM D523 and an average rubber mar test score of at least 7 when tested according to the rubber mar test described herein using black rubber doorstop, black cabinet castor wheel, and a black block resistance rubber stopper as marring objects.

Embodiment 47: A coated substrate formed from the coating composition of any one of Embodiments 1 to 45 applied directly or indirectly to a substrate consisting of drywall, wood, vinyl, metal, cementitious fibreboard, or combinations thereof.

What is claimed is:

1. A water-based architectural paint coating composition comprising:
   a film-forming binder;
   a water-based carrier liquid;
   monosize polymeric particles having a particle size coefficient of variation (CV) of about 50 percent or less and a Shore D hardness of at least about 75 as measured by ASTM D2240-15;
   a polysiloxane dispersible in water;
   the coating composition having a pigment volume concentration (PVC) of 10 to 50; and
   wherein the monosize polymeric particles include a polyalkyl (meth)acrylate.

2. The coating composition of claim 1, wherein the monosize polymeric particles have a round cross-section.

3. The coating composition of claim 2, wherein a cross-section of the monosize polymeric particles has an aspect ratio from 1:1 to 3:1.

4. The coating composition of claim 1, wherein the $D_{50}$ of the monosize polymeric particles is from 5 to 30 microns.

5. The coating composition of claim 1, wherein the monosize polymeric particles are present in the coating composition in an amount of at least 4 weight percent based on the total weight of components in the coating composition.

6. The coating composition of claim 1, wherein the polyalkyl (meth)acrylate is polymethylmethacrylate.

7. The coating composition of claim 1, wherein the monosize polymeric particles have a glass transition temperature (Tg) of at least 100° C. and no more than 180° C. as measured by Differential Scanning calorimetry.

8. The coating composition of claim 1, wherein the polysiloxane is present in the coating composition in an amount of at least 0.25 wt. % to at most 5 wt. % based on total weight of components in the coating composition.

9. The coating composition of claim 1, wherein the coating composition further includes an opacifying inorganic pigment.

10. The coating composition of claim 1, wherein the opacifying inorganic pigment includes titanium dioxide.

11. The coating composition of claim 1, wherein the opacifying pigment is present in the coating composition in an amount of no more than 10 weight percent based on the total components of the coating composition.

12. The coating composition of claim 1, further including wax particles having a median particle size of 1 to 6 microns.

13. The coating composition of claim 12, wherein the wax particles are micronized or spray melt particles.

14. The coating composition of claim 12, wherein a $D_{50}$ particle size of the monosize polymeric particles is larger than the $D_{50}$ particle size of the wax particles.

15. The coating composition of claim 1, wherein the coating composition further includes an inorganic extender, a wet-state preservative, a rheology modifier, a colorant, a mildewcide, a surfactant, a defoamer, a coalescent, a plasticizer, an anti-settling agent, a pH modifier, a UV absorber, a crosslinker, or a thickener.

16. The coating composition of claim 1, wherein when the coating composition is coated on a substrate by drawdown using a 4 mil Bird bar and allowed to cure for about 10 minutes at room temperature followed by 30 minutes at 50° C., the cured coating has a gloss of less than about 10 and/or a sheen of less than about 10 as measured by ASTM D523.

17. The coating composition of claim 16, wherein when the coating composition of any preceding claim is coated on a substrate by drawdown using a 4 mil Bird bar and allowed to cure for about 10 minutes at room temperature followed by 30 minutes at 50° C., the cured coating has a gloss of less than 5 and a sheen of less than 5 as measured by ASTM D523.

18. The coating composition of claim 1, wherein the film-forming binder is a (meth)acrylic latex, a styrene-acrylic latex, a urethane modified acrylic latex, or combinations thereof.

19. A cured coating obtained from the coating composition of claim 1, wherein when deposited on a substrate and cured, the cured coating has a gloss of less than about 10 and/or a sheen of less than 10 pursuant to ASTM D523, and
   wherein the cured coating has a static coefficient of friction (COF) of 0.75 to 1.5 as measured by ASTM D1894-14, or a kinetic coefficient of friction (COF) of 0.25 to 0.75 as measured by ASTM D1894-14.

20. The cured coating of claim 19, wherein the coating has an average rubber mar test score of at least 7 when tested according to the rubber mar test described herein using black rubber doorstop, black cabinet castor wheel, and a black block resistance rubber stopper as marring objects.

* * * * *